United States Patent [19]

Jantzen et al.

[11] Patent Number: 5,434,333
[45] Date of Patent: Jul. 18, 1995

[54] METHOD FOR TREATING MATERIALS FOR SOLIDIFICATION

[75] Inventors: Carol M. Jantzen; John B. Pickett, both of Aiken; Hollis L. Martin, N. Augusta, all of S.C.

[73] Assignee: The United States of America as represented by the United States Department of Energy, Washington, D.C.

[21] Appl. No.: 946,733

[22] Filed: Sep. 18, 1992

[51] Int. Cl.$^6$ .................................................. G21F 9/00
[52] U.S. Cl. ................................ 588/3; 588/9; 588/11; 588/14; 588/252; 588/256; 501/152; 501/154; 501/155; 976/DIG. 385
[58] Field of Search ............... 252/629; 588/252, 256, 588/253, 3, 11, 9, 14; 501/155, 152, 154; 976/DIG. 385

[56] References Cited

U.S. PATENT DOCUMENTS

| | | | |
|---|---|---|---|
| 4,020,004 | 4/1977 | Schulz et al. | 501/155 |
| 4,272,293 | 6/1981 | Hooykaas | 501/155 |
| 4,460,292 | 7/1984 | Durham et al. | 405/129 |
| 4,534,893 | 8/1985 | Dippel et al. | 252/629 |
| 4,622,175 | 11/1986 | Tamata et al. | 106/606 |
| 4,661,291 | 4/1987 | Yamasaki et al. | 252/629 |
| 4,725,383 | 2/1988 | Hayashi et al. | 501/155 |
| 4,735,784 | 4/1988 | Davis et al. | 423/111 |
| 4,820,325 | 4/1989 | Wheeler | 501/155 |
| 4,880,468 | 11/1989 | Bowlin et al. | 106/98 |
| 5,008,021 | 4/1991 | Conner et al. | 210/751 |
| 5,078,795 | 1/1992 | Conner et al. | 106/624 |
| 5,203,901 | 4/1993 | Suzuki et al. | 65/33 |
| 5,245,121 | 9/1993 | Gall et al. | 588/257 |

*Primary Examiner*—Ngoclan T. Mai
*Attorney, Agent, or Firm*—Brian R. Tumm; Harold M. Dixon; William R. Moser

[57] ABSTRACT

A method for treating materials such as wastes for solidification to form a solid, substantially nonleachable product. Addition of reactive silica rather than ordinary silica to the material when bringing the initial molar ratio of its silica constituent to a desired ratio within a preselected range increases the solubility and retention of the materials in the solidified matrix. Materials include hazardous, radioactive, mixed, and heavy metal species. Amounts of other constituents of the material, in addition to its silica content are also added so that the molar ratio of each of these constituents is within the preselected ranges for the final solidified product. The mixture is then solidified by cement solidification or vitrification. The method can be used to treat a variety of wastes, including but not limited to spent filter aids from waste water treatment, waste sludges, combinations of spent filter aids and waste sludges, combinations of supernate and waste sludges, incinerator ash, incinerator offgas blowdown, combinations of incinerator ash and offgas blowdown, cementitious wastes and contaminated soils.

19 Claims, 2 Drawing Sheets

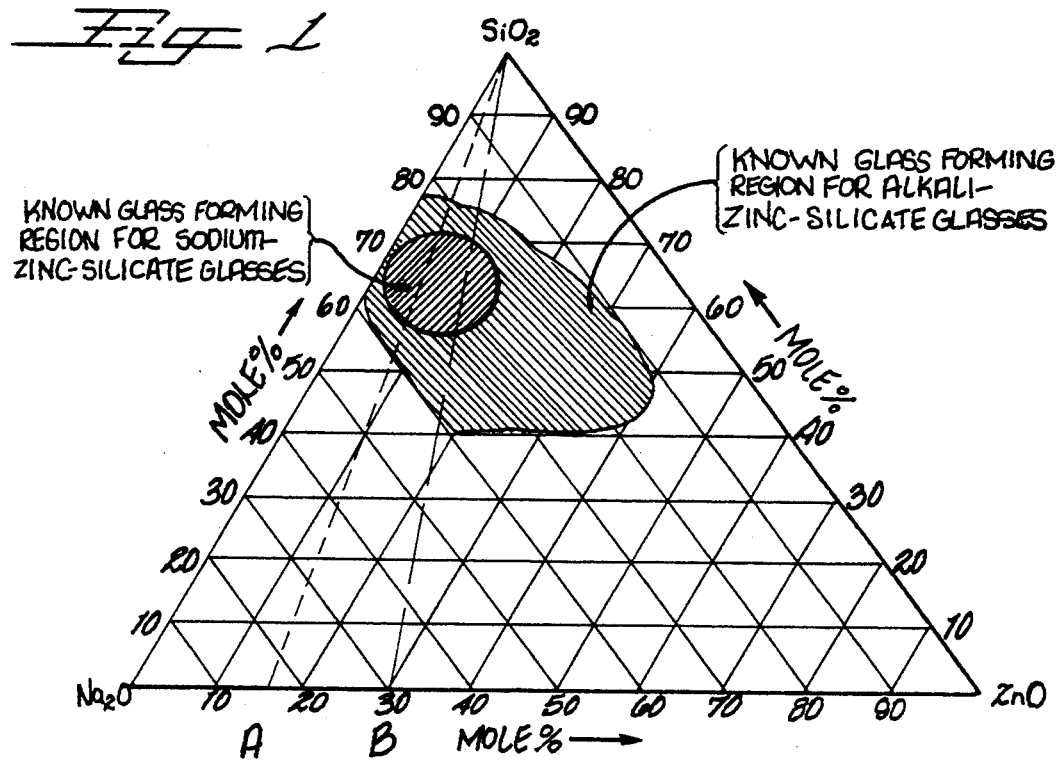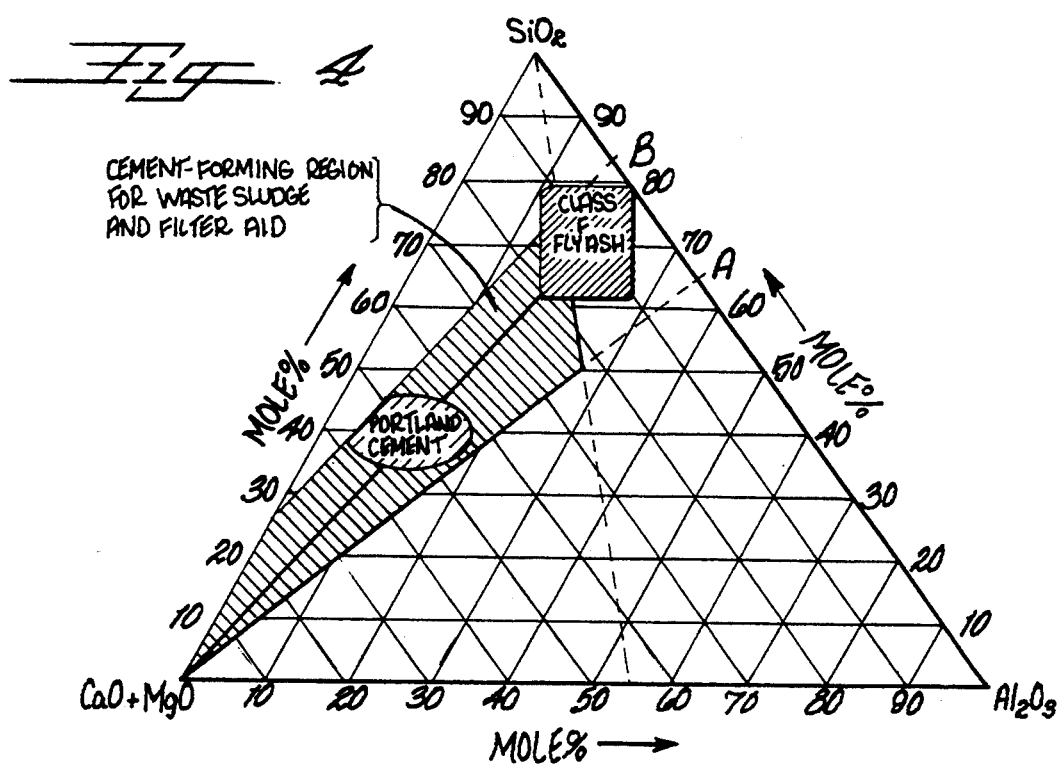

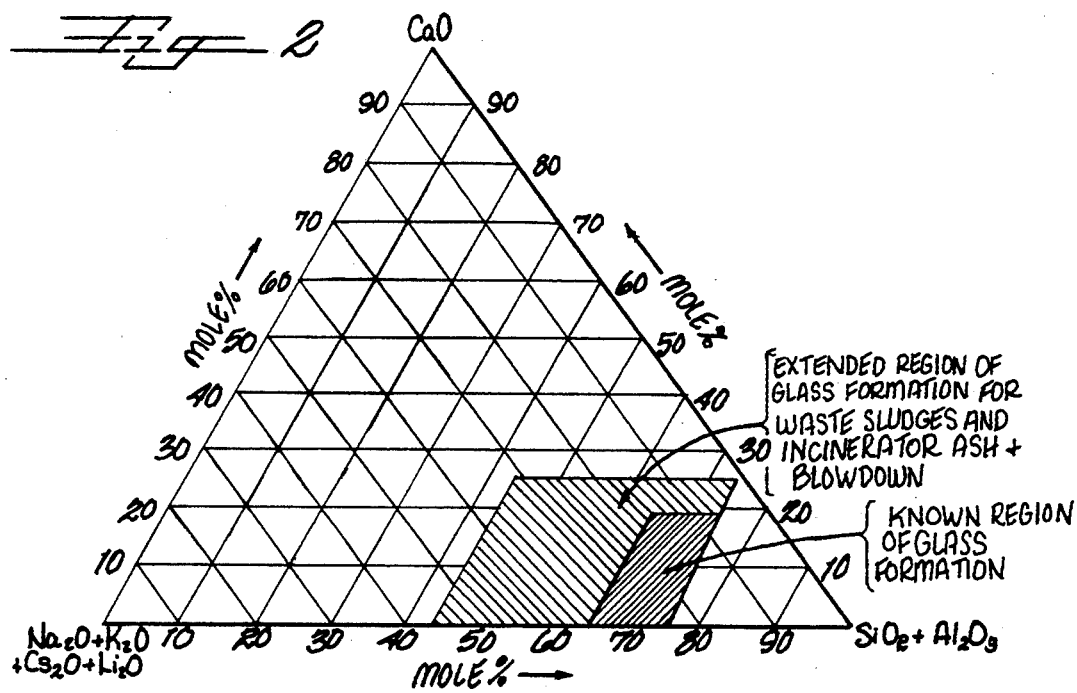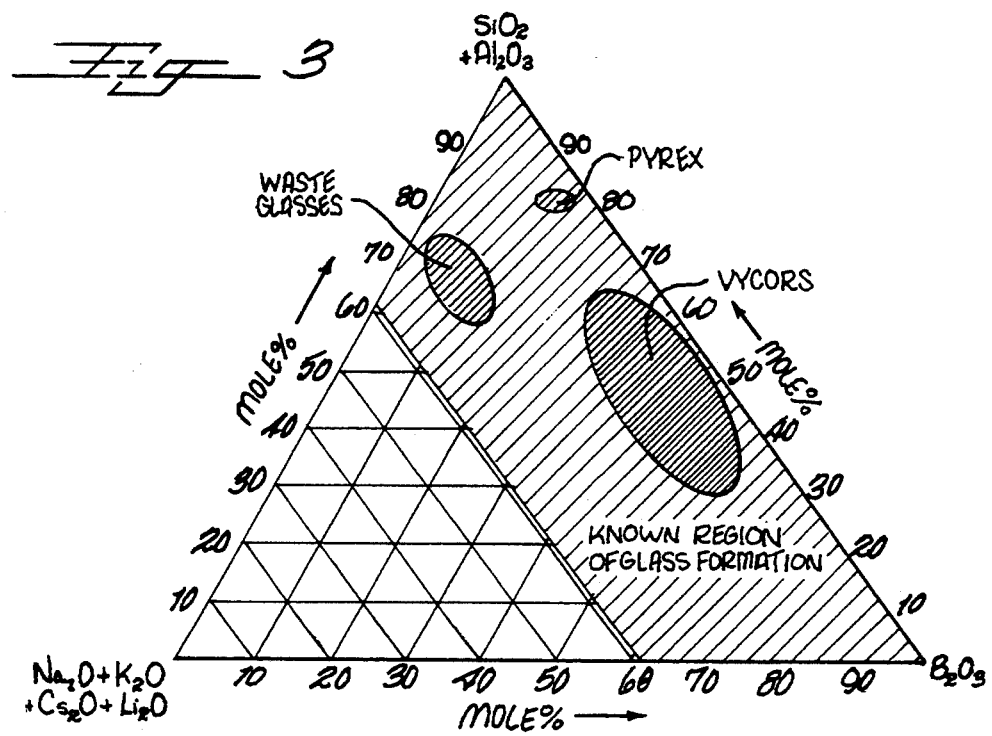

METHOD FOR TREATING MATERIALS FOR SOLIDIFICATION

BACKGROUND OF THE INVENTION

1. Field of the Invention

The present invention relates to a method for treating materials for solidification. In particular, the present invention relates to a method for preparing materials including radioactive wastes, hazardous chemical wastes, and mixed radioactive and hazardous chemical wastes for solidification in glass or cement. The method also relates to a vitrified composition prepared by said method. The United States Government has rights in this invention pursuant to Contract No. DE-AC09-89SR18035 between the U.S. Department of Energy and Westinghouse Savannah River Company.

2. Discussion of Background

Many industrial processes generate hazardous wastes in the form of aqueous waste streams, sludge solids, aqueous supernate, incinerator ash, incinerator off gas condensate, and so forth. Waste treatment processes my themselves generate secondary hazardous wastes. For example, solids can be filtered from an aqueous waste stream by passing the stream through a perlite (PERFLO) or diatomaceous earth filter. The spent filter medium is impregnated with the materials removed from the waste stream, such as heavy metals and other hazardous substances. The spent filtration wastes must themselves be treated and stabilized before disposal. (As used herein, the term "hazardous waste"includes wastes containing substances commonly recognized as hazardous, including but not limited to, chemical wastes, radioactive wastes, mixed chemical and radioactive wastes, heavy-metal-containing wastes, and hazardous organics.)

Stabilizing hazardous wastes using currently available technology is expensive and requires enormous resources of equipment and personnel. Stabilization processes must be operated within guidelines established under the Resource Conservation and Recovery Act (RCRA), and the stabilized product must meet stringent state and federal standards. In the case of radioactive or mixed wastes, the stabilized wastes must often be stored for long periods of time waiting for decay of the radioactive components before transportation to an approved underground repository. Minimizing the waste volume is important in minimizing storage, transportation, and final disposal costs.

Incinerators are often used to destroy the hazardous constituents of solid and liquid wastes. Byproducts of incineration include bottom ash, aqueous incinerator offgas condensate (blowdown), or mixtures of ash and offgas condensate, all of which may contain residual hazardous and/or radioactive substances.

Hazardous wastes may be solidified by vitrification incorporation into a glass matrix—or cementation. In typical cementation processes, cement-forming materials are added to the waste; any water in the waste solution remains in the solidified product. Therefore, the solidified product has a larger volume than the original waste solution. Also, water, including groundwater, can leach compounds out of cement over time and cement is naturally porous, so the cement-stabilized product must be stored in leak-proof containers to prevent leaching.

Glass is the most long-term environmentally acceptable waste form. Glass is stable and extremely durable. Moreover, the hazardous species are chemically bonded in the glass structure, forming a substantially nonleachable composition. A number of vitrification processes for hazardous wastes have been described. Wheeler (U.S. Pat. No. 4,820,325) stabilizes toxic waste using a glass precursor material such as diatomaceous earth mixed with a compatible glass precursor material such as soda ash, lime (CaO) and alumina. The normally leachable toxicant becomes fixed within the glass when the mixture is vitrified. Tamara, et al. (U.S. Pat. No. 4,622,175) mix radioactive waste with water and an alkali silicate composition prepared from amorphous reactive silica (activated clay). The mixture is allowed to set in a weather-resistant container. Hayashi, et al. (U.S. Pat. No. 4,725,383) add ZnO, or a mixture of ZnO with $Al_2O_2$ and/or CaO, to a radioactive sodium borate waste solution. The resulting mixture is dehydrated and melted to produce a vitrified solid solution. Schulz, et al. (U.S. Pat. No. 4,020,004) vitrify radioactive ferrocyanide compounds by fusion with sodium carbonate ($Na_2CO_3$) and a mixture of basalt and $B_2O_3$, or silica ($SiO_2$) and lime (CaO).

The solubility of hazardous, radioactive, mixed, and heavy metal wastes during vitrification processes is often limited, resulting in hazardous residues that must in turn be treated before disposal. Retention of hazardous substances in cement is further limited by leaching. In addition, the solidified cement product may have a larger volume than the original waste solution. There is a need for an efficient, cost-effective method for treating wastes for solidification. The method should produce a stable waste composition that meets regulatory standards without adding to disposal volume.

SUMMARY OF THE INVENTION

According to its major aspects and broadly stated, the present invention is a method for treating materials, including hazardous wastes, for solidification in a solid, substantially nonleachable product. Addition of amorphous reactive silica to the material results in enhanced stabilization and retention of hazardous species in either glass or cement. The process includes adjustment of the composition of the waste to take advantage of common glass-forming or cement-forming constituents already present therein.

The waste is analyzed to determine its composition, including the concentration of common glass-forming and cement-forming compounds, in order to assess the amount and type of additives needed to obtain an end product with the desired constituents. The waste may be a liquid, a solid, or a sludge, and may contain chemical waste, radioactive waste, mixed chemical and radioactive, heavy metals, or other wastes. The amount of each constituent needed is added to the waste, and the resulting mixture assayed to verify that its combined constituents are within the correct operational range. The mixture is processed to form a solid, stable product.

The method increases waste loading in glass or cement (that is, the amount of waste per unit volume disposed) and produces a solid waste form that meets Environmental Protection Agency (EPA) standards. The method can reduce waste volume by up to 97% when compared to currently-used cement solidification techniques. It can be used to treat spent filter aids from waste water treatment, waste sludges, combinations of spent filter aids and waste sludges, combinations of supernate and waste sludges, incinerator ash, incinerator offgas blowdown, combinations of incinerator ash and offgas blowdown, cement waste forms in need of remediation, and SiO$_2$-poor soils. The method is useful in solidifying other materials, including but not limited to ion exchange zeolites, inorganic filter media, asbestos, glass fiber filters, contaminated soils, cementitious wastes, and additives such as fillers and colorizing or texturizing agents. Some ion exchange zeolites, asbestos, and fiber filters are themselves reactive silica materials, thus lend themselves to vitrification or cementation on an anhydrous basis.

An important feature of the present invention is the addition of amorphous reactive silica to the waste to make either a glass-forming or cement-forming composition. Reactive silica is amorphous, highly porous, and has a large surface area. Because of its large surface area, reactive silica has a large number of available sites for bonding with other materials. Several forms of reactive silica can be used, including precipitated SiO$_2$, perlite (PERFLO), diatomaceous earth, and pyrolyzed rice husk, all containing approximately 70 wt. % or more SiO$_2$. In the case of vitrification, addition of reactive silica to the waste lowers the temperature needed for vitrification and increases solubility of the hazardous species in soda-zinc oxide-silica, soda-lime-silica, and borosilicate glass formulations. Waste loading up to approximately 70 wt. % can be achieved for significant volume reduction (up to approximately 97%).

For cementation, reactive silica, together with portland cement or Ca(OH)$_2$ is added to the waste. Reactive silica improves the retention of hazardous waste species in cement. Waste loading up to approximately 75 wt. % can be achieved, with corresponding reductions in volume of up to 81%.

Another feature of the present invention is the combination of the use of amorphous reactive silica and currently-used solidification techniques, particularly vitrification and cementation depending on the composition of the wastes to be treated, The additives are adjusted based on the waste composition so that the constituents of the combined mixture fall in the desired ranges, minimizing the amounts of additives needed and consequently maximizing waste loading in the final product. Then the usual equipment for solidification can be used; no new equipment is needed.

An additional feature of the present invention is the use of a reactive silica-containing material during pretreatment of an aqueous waste stream. The maximum achievable waste volume reductions are obtained by utilizing a reactive silica-containing material during pretreatment of hazardous, radioactive, or mixed waste streams by filtration or ion exchange. The resulting spent filter medium is then used to prepare the cement-forming composition. The reactive silica-containing material is selected based both on its ability to remove the soluble or entrained hazardous constituents from the aqueous stream and its subsequent ability to improve the stability of the final waste form. The use of reactive silica material as the filtration medium therefore allows a substantial volume reduction of the final cement waste form.

Other features and advantages of the present invention will be apparent to those skilled in the an from a careful reading of the Detailed Description of a Preferred Embodiment presented below and accompanied by the drawings.

BRIEF DESCRIPTION OF THE DRAWINGS

In the drawings,

FIG. 1 shows the compositional range for vitrification according to the method of the present invention in the soda-silica-zinc oxide system.

FIG. 2 shows the compositional range for vitrification according to the method of the present invention in the soda-lime-silica (SLS) system;

FIG. 3 shows the compositional range for vitrification according to the method of the present invention in the sodium-boro-silicate system; and FIG. 4 shows the compositional range for cementation according to the method of the present invention with amorphous reactive silica and Ca(OH)$_2$ and/or amorphous reactive silica and cement.

DETAILED DESCRIPTION OF A PREFERRED EMBODIMENT

The present invention is a method for preparing materials, including waste materials, for solidification. Amorphous reactive silica is added in specific amounts to the wastes to stabilize the waste and retain its hazardous constituents. Reactive silica improves the solubility and retention of radioactive, mixed, and heavy metal species when solidified with cement or vitrified. It increases achievable waste leading and produces a solid waste form that meets Environmental Protection Agency (EPA) standards.

The method includes the following steps:
1. The waste is analyzed to determine its composition, including the concentrations of common glass-forming and cement-forming compounds. If desired, the waste may be pretreated by evaporation or other suitable processes to remove excess water and thereby further reduce the volume of the final product. Preferably, the pretreated waste contains at least approximately 50 wt. % solids.
2. A final product composition is selected based on the composition of the waste. As will be evident from the following discussion, the composition of the product depends on the initial composition of the waste. A set of constituents for the product composition, one of which constituents is silica, is proposed. The constituents have molar ratios with respect to each other, each molar ratio having a preselected desired range. The amounts of the constituents may vary, but still yield a good-quality solid product as long as the molar ratios remain within these ranges. Each constituent must be present within an appropriate range of amounts relative to the waste; the amounts am readily calculated from the molar ratios.
3. For each constituent of the product, the amount of that constituent that must be added to the waste is calculated. With the choice of final product, many types of waste require only one additive, amorphous reactive silica, to produce a stable glass or cement waste form. Reactive silica is amorphous and highly porous. It has a large surface area, typically greater than approximately 50 m$^2$/g compared to no more than approximately 1 m$^2$/g for pulverized crystalline silica (sand). Because of its large surface area, reactive silica has a large number of available sites for bonding with other materials. As will be described, reactive silica improves the solubility and retention of hazardous species in glass and increases the retention of these species in cement. Other types of waste may require small amounts of additional materials.

If desired, an amount of reactive silica greater than the minimum needed may be added to the waste to optimize retention of the waste in the final product, particularly where the waste already contains ordinary silica. It will be understood that the total amount of silica, including reactive silica, in the mixture should be within the preselected operational range.

4. The additional constituents are added to the waste. The amount of each constituent needed is added to the waste, and the resulting mixture assayed to verify that its combined constituents are within the desired ranges.

5. The mixture is processed to form a solidified final product. For a glass waste form, the mixture is heated to fusion temperature in a glass melted, poured, and allowed to cool and solidify. For a cement waste form, the mixture is poured into suitable containers and allowed to set and cure.

The method can be used to solidify a wide range of hazardous wastes in stable form for storage and/or disposal. The method is especially adapted to vitrification and cementation, as seen in the following examples:

A. Vitrification

The vitrification process is tailored to take advantage of the common glass constituents (Si, Al, P, Na, and Ca) already present in many waste streams. Additives are chosen depending on the types and amounts of these constituents present in the waste, added and blended to make a glass-forming composition. For many types of waste, only one additive—reactive silica—is needed. The tolerance of glass for many kinds of wastes, together with the presence of common glass constituents in many hazardous wastes, enables the process to be very tolerant to process chemistry variations resulting from variations in the waste composition.

The vitrification process includes the following steps:

1. The waste material is analyzed to determine its composition, including the concentrations of common glass constituents such as Si, Al, P, Na, and Ca. The waste may be in liquid, solid, or semi-solid form, and may contain hazardous compounds including radioactive, mixed, and heavy metal-containing compounds, and various organic compounds.

2. A glass-forming system is chosen, and a set of proposed constituents for the glass product is determined. Each constituent has a molar milo with respect to the other constituents, and each molar ratio has a preselected range. Good-quality glass contains amounts of each constituent such that the molar ratios are within these preselected ranges. Each constituent must be present within an appropriate range of amounts relative to the waste.

3. For each constituent of the glass, the amount of that constituent already present in the waste is found. The amount of each constituent that must be added to the waste is determined so that the total amount of that constituent in the mixture is within the appropriate range.

Suitable glass-forming systems include, but are not limited to, the soda-silica-zinc oxide, soda-lime-silica (SLS), and sodium-borosilicate systems. It will be understood that the choice of glass-forming system depends on the particular composition of the waste to be stabilized.

With an appropriate choice of glass-forming system, many types of waste require only one additive—silica. Several forms of silica are appropriate, including crystalline silica (sand) and reactive silica (precipitated $SiO_2$, perlite (PERFLO), diatomaceous earth, and pyrolyzed flee husks). Diatomaceous earth contains approximately 70 wt. % (anhydrous) $SiO_2$, 16.7 wt. % $Al_2O_3$, and small amounts of other compounds including $K_2O$, $Na_2O$, and ZnO. Perlite contains approximately 74.5 wt. % $SiO_2$, 12.5 wt. % $Al_2O_3$, and lesser amounts of $K_2O$, CaO, $Fe_2O_3$, $Na_2O$, and other compounds. Pyrolized rice husk ash contains over 95% $SiO_2$, about 1.7 wt. % $P_2O_5$, and trace amounts of other compounds including MgO, $MnO_2$, and $Na_2O$.

4. The additives are mixed with the wastes to make a glass-forming composition.

5. The composition is processed to form a solid final product. Typically, the composition is fed into a reciter and heated to fusion temperature. Suitable types of reciter for processing the composition include microwave, arc, induction, and joule-heated melters.

After the composition melts and its various ingredients combine, the molten glass can be poured off into molds or canisters. Additional feed is added and melted continuously or in batches, as desired. Alternatively, an "in-can" process may be used. That is, the composition is placed in a suitable container, electrodes are inserted, and the composition is heated in situ. After melting, the electrodes are removed and the melt is solidified.

Preferably, the composition is processed in a continuously stirred glass melter. Continuous agitation of the melt pool by stirring creates homogeneous glass without having to rely on convection currents as in other types of reciters. Stirring also lowers melt processing temperatures by about 100° C. as compared to conventional melters, and helps oxidize reducing melts and/or reducing species in the melts by exposing the stirred glass to the atmosphere.

During vitrification, organics present in the waste, including carbon, decompose to CO, $CO_2$ and water; the water vaporizes. The carbonate species decompose into $CO_2$, the OH species vaporize as water, and the halides vaporize as either NaCl in the absence of steam or as HCl with minimal NaCl in the presence of steam by pyrohydrolysis. Sulfates vaporize as $Na_2SO_4$ (dry) or $H_2SO_4$ (wet); nitrates vaporize as $NO_x$. The melter off-gas condensate may contain a minimal amount of dilute HCl and heavy metals which can be readily processed. Phosphate ($PO_4$) enters the glass as either $PO_4$ structural units or as $P_2O_5$. After decomposition and vaporization of the carbonates, halides, sulfates, organics, and water, the remaining vitrified waste on an elemental basis typically has less than 10% of the original waste volume.

6. The molten glass is poured off into suitable containers and cooled, or otherwise cooled for disposal.

Addition of reactive silica to the waste to make a glass-forming composition results in lower vitrification temperatures, and increased solubility and tolerance of soda-zinc oxide-silica, soda-lime-silica, and borosilicate glass formulations to bind the waste species chemically. If desired, the waste may be pretreated by evaporation or other suitable processes to remove excess water, thereby improving the efficiency of the vitrification process. Preferably, the pretreated waste contains at least approximately 50 wt.% solids, but wastes containing lesser amounts of solids may be used.

The process can be used to vitrify a wide range of hazardous wastes in stable form for storage and/or disposal. Wastes treatable with the process include spent filter aids from waste water treatment, aqueous supernate, waste sludge, incinerator ash, incinerator offgas blowdown, and combinations thereof. For example, a reactive silica-containing material can be used during filtration or ion exchange of an aqueous waste stream. The reactive silica material is selected based both on its ability to remove the soluble or entrained hazardous constituents from the aqueous stream and its subsequent ability to improve the stability of the final waste form. In addition, the process can be used to treat soils and cement waste forms in need of remediation. Achievable waste loadings of up to 50% correspond to waste volume reductions as high as 97%, as will be seen in the following examples.

EXAMPLE 1

A rotary kiln incinerator for low-level-radioactive, hazardous and/or mixed wastes thermally destroys toxic constituents and reduces the volume of both solid and liquid waste materials. The incinerator generates wastes that must be stabilized before disposal, including bottom ash and offgas condensate (blowdown). Both wastes contain significant amounts of sodium oxide ($Na_2O$) and lime ($CaO$).

The blowdown contains approximately 80 wt. % or more water. The solid fraction may include sodium compounds, chloride salts, entrained ash, radioactive, various inorganic compounds, and hazardous contaminants that were entrained or volatilized during incineration. The blowdown may contain up to approximately 10 wt. % NaCl and small amounts of other sodium compounds, including $NaHSO_3$, $NaOH$, $Na_3PO_4$, and so forth. Organic constituents may include very small amounts of benzene, biphenyl, diphenylamine, kerosene, methanol, cellulose, polyvinylchloride, and so forth. The liquid fraction may contain radionuclides, halides, and soluble heavy metals. The particular composition of the blowdown varies depending on the materials supplied to the incinerator. If desired, the blowdown may be pretreated by evaporation, waste water treatment, or other suitable processes to remove excess water.

To formulate a glass composition for the blowdown, its sodium, calcium and zinc oxide concentrations available for complexing with glass-forming $SiO_2$ am determined. A glass-forming system is chosen, depending on the concentrations of common glass constituents found in the blowdown sample. The amounts of $SiO_2$ and other additives needed to make a glass-forming composition are determined. Vitrification was tested in the soda-silica-zinc oxide, glass-forming system.

Referring now to FIG. 1, there is shown the compositional range for vitrification according to the process of the present invention in the soda-silica-zinc oxide system. The three apices of the ternary phase diagram represent soda ($Na_2O$), zinc oxide ($ZnO$) and silica ($SiO_2$). A point at an apex, such as the $SiO_2$ apex, represents a composition composed entirely of that constituent. A point on the opposing axis represents a composition entirely without that constituent. The relative distance of a point from each apex represents the molar percentage composition of a ternary mixture in terms of the three constituents. Thus, a point on the $Na_2O$-$ZnO$ axis represents a composition containing no $SiO_2$, with a $Na_2O/ZnO$ molar ratio as indicated in mole % along the axis. In the triangular representation, the addition of a third component to a mixture of the other two components is represented by a straight line from the apex of the third component. Thus, additions of $SiO_2$ to a mixture of $Na_2O$ and $ZnO$ are represented along a line from the appropriate point on the $Na_2O$-$ZnO$ axis to the $SiO_2$ apex.

The two shaded areas are known glass-forming regions for sodium-zinc-silicate glasses and alkali-zinc-silicate glasses. Incinerator blowdown wastes having $Na_2O/ZnO$ molar ratios at points A (approximately 16 wt. %) and combinations of incinerator blowdown and bottom ash having $Na_2O/ZnO$ molar ratios at point B (approximately 30 wt. %) were studied. Connecting points A and B to the $SiO_2$ apex indicates the compositional ranges of waste material and glass-forming $SiO_2$ additive that were tested.

Five $SiO_2$ additives were tested, including crystalline silica (sand) and four reactive silica additives: precipitated $SiO_2$, perlite (PERFLO), diatomaceous earth, and pyrolyzed rice husks.

Waste compositions consisting of blowdown with or without admixtures of ash having approximately 3.3–8.0 wt. % ZnO and 16.5%–34.0 % $Na_2O$ were tested. Waste loadings were in the range of 33%–50%, with the silica additive forming the balance of the composition: The concentrations of $Na_2O$ and ZnO in the waste were sufficient that $SiO_2$ was the only additive needed to prepare a glass-forming composition.

The four reactive silica additives improved the solubility of the heavy metals (Zn, Bi, Co, Cu, Mg, Mn, Mo, Sn, Ti), hazardous wastes (Ni, Cr, Cd, Hg, Pb) and mixed waste constituents in the glass as compared to granular $SiO_2$, and lowered melt temperatures. Formulations with reactive silica admixtures in the sodium-zinc-silicate glass-forming region (approximately 55 wt. %–72 wt. % $SiO_2$) of FIG. 1 resulted in good-to-excellent homogeneous glass products.

Diatomaceous earth was most effective in lowering the vitrification temperature (to approximately 1150° C. in laboratory-scale testing, corresponding to about 11350° C. in a stirred glass melter) and increasing waste solubility. Volatilization of hazardous waste constituents (except potentially for mercury) does not occur at these low melt temperatures. The only tertiary waste stream created by vitrification of the wastes is dilute HCl from pyrohydrolysis of the NaCl and heavy metal chlorides in the composition. In contrast, other vitrification processes require melt temperatures in excess of 1300–°1400° C. which can cause excessive volatility of hazardous waste species.

The best glasses resulted from formulations containing a mixture of blowdown and ash, and diatomaceous earth. Formulations containing rice husk ash (approximately 97 wt. % $SiO_2$) gave homogeneous glass, but the composition melted and poured at higher temperatures (1200° C.) than formulations containing diatomaceous earth. Increased solubility of the waste species allowed waste loadings up to approximately 50 wt. %, providing up to a 97% volume reduction compared to conventional stabilization in cement.

EXAMPLE 2

Since the blowdown residue of Example 1 contained high concentrations of $Na_2O$ and CaO, the soda-lime-silica (SLS) glass-forming system was also tested. Due to the high concentrations of soda and lime in the blowdown, the use of SLS glass requires only one simple additive, $SiO_2$.

The compositional range for vitrification according to the process of the present invention in the SLS system is shown in FIG. 2. The three apexes of the ternary phase diagram represent the sum of the alkali oxides (including $Na_2O$, $K_2$, $Cs_2O$, and $Li_2O$), $SiO_2$ (including $Al_2O_3$), and CaO. Wastes containing up to approximately 9% $Al_2O_3$ with a range of $Na_2O$/CaO molar ratios were tested with varying admixtures of silica additives.

Formulations containing approximately 45–50 wt. % blowdown and ash, and the balance reactive silica constituted glass-forming mixtures in the SLS system. Melt temperatures in laboratory scale testing were less than about 1150° C. (corresponding to approximately 1050° C. for a stirred glass melter). As noted above, volatilization of hazardous waste species is minimal at such low melt temperatures.

Compositions made with reactive silica formed good quality glasses within the normal range of glass formation in the SLS system. Perlite and diatomaceous earth formed the best homogeneous glasses, with achievable waste loadings in the range of approximately 45%–50%. These were also easier to fabricate and poured more readily at 1150° C. than glasses made with precipitated $SiO_2$ and flee husk ash. Compositions made with crystalline silica (sand) could not be vitrified in the SLS system.

In addition to the known region of glass formation, the extended region shown in FIG. 2 was delineated. Compositions in this extended region also formed good glass. This effect may be due to the high ZnO content of the waste. Also, the heats of mixing of multicomponent glasses are known to enlarge glass-forming regions beyond the representation possible in two dimensions.

Reactive silica lowers the vitrification temperature and increases the solubility of the heavy metal, hazardous and mixed waste constituents in the glass. In addition, the high ZnO content of the waste improves durability of the glass and stabilizes the glass against crystallization. If desired, the blowdown could be pretreated to reduce the volume of the waste before vitrification. Spent or virgin filter aids could be used as the source of reactive silica for stabilization in glasses.

The 45–50 wt. % waste loading yields up to 97% waste volume reduction compared to alternative stabilization technologies, and results in significant cost savings in storage alone. Changes in the composition of the waste can easily be compensated for by adjusting the ratio of the $SiO_2$ additive to the amount of waste. The SLS glass system is tolerant of a wide range of variability in the waste composition.

These SLS-type waste glasses will meet all applicable EPA standards. The glasses will perform well in the standard Toxicity Characteristic Leaching Procedure (TCLP) and in the more severe leaching tests developed for high level waste compliance, with Cr, Pb, Ba, Ag, Se, and Cd releases below the analytic detection limits. They have high potential to meet current Land Disposal Restrictions (LDR), which would allow disposal into low level burial sites at additional cost savings.

EXAMPLE 3

Waste water resulting from production of reactor components for nuclear weapons materials reactors was treated with perlite and diatomaceous earth to remove excess liquid, yielding a gelatinous hydroxide sludge. The sludge is a RCRA type F006 mixed waste, containing radioactive (depleted uranium) and hazardous (Ni, Cr, Pb) species. It has high concentrations of $NaNO_3$, $SiO_2$ and $Al_2O_3$. The sludge was mixed with the wet, spent filter aids (perlite and diatomaceous earth) to form a composite waste sludge.

The composite waste sludge was mixed with calcium carbonate ($CaCO_3$), with or without additional $Na_2O$ as $Na_2CO_3$, to form a composition in the extended region of SLS glass formation shown in FIG. 2. The composition was vitrified using the procedure described above. For example, a mixture containing 70 wt. % waste and filter aid, 10 wt. % $CaCO_3$ and 20 wt. % $Na_2CO_3$ forms high quality SLS glass at 1150° C. Waste loadings up to approximately 80 wt. % can be achieved at higher melting temperatures.

EXAMPLE 4

The composite sludge of Example 3 was also vitrified in the sodium-boro-silicate system (FIG. 3). The composite containing the spent filter aids was mixed with borax (a source of $B_2O_3$ and $Na_2O$) to form a composition in the glass-forming region for waste glasses (FIG. 3). Addition of borax and $Na_2CO_3$ also yielded glass-forming compositions. By way of example, compositions containing (1) 70 dry wt. % sludge and filter aid, and 30 wt. % (anhydrous) borax, and (2) 70 wt. % sludge and filter aid, 15 wt. % (anhydrous) borax and 15 wt. % $Na_2CO_3$ yielded good quality borosilicate glass.

Use of reactive spent silica filter aids as a source of reactive silica allowed waste loadings up to approximately 70 wt. % to be vitrified at 1150° C., with associated waste volume reductions up to approximately 77%. Waste loadings as low as 50 wt. % result in a 70% volume reduction from the volume of the wet sludge. With this process, 1000 gallons of sludge and spent filter aids yield about 125 gallons of glass with commensurate reductions in storage and/or transportation costs.

B. Cementation

Stabilization of spent filter aid or mixtures of sludge and spent filter aid is achieved by addition of appropriate amounts of portland cement or calcium hydroxide to produce EPA-acceptable cementitious waste forms. Achievable waste loadings in the range of approximately 50%–75% correspond to waste volume reductions in the range of 70%–81%.

The cementation process includes the following steps:
1. The waste material is analyzed to determine its composition. If desired, excess water is removed by evaporation or other suitable process, so that the waste preferably contains no more than approximately 50 wt. % water.
2. A cement-forming system is chosen, and a set of proposed constituents for the final product is determined. Each constituent has a molar ratio with respect to the other constituents, each molar ratio having a preselected range. A composition having molar ratios within these preselected ranges yield good-quality cement. Each constituent must be present within an appropriate range of amounts relative to the waste.
3. For each constituent of the cement, the amount of that constituent already present in the waste is determined. The additional amount of each constituent that must be added to the waste, so that the combination of the waste and these additional amounts contains each constituent within the appropriate range, is determined.

Many types of waste require addition only of amorphous reactive silica, as well as portland cement, Ca(OH)$_2$, the alkali metal hydroxides, or the alkaline earth hydroxides, such as NaOH, Mg(OH)$_2$, and so forth. As will be discussed below, reactive silica improves the retention of the waste species in cement due to its large surface area and concomitant reactivity. Other types of waste may require small admixtures of additional materials.

4. The additives are mixed with the waste to make a cement-forming composition, and the composition is poured off into suitable molds or canisters to solidify.

Addition of reactive silica to the waste results in increased retention of the waste species in the final cement form. If desired, the wastes may be pretreated by evaporation or other suitable process to remove excess water and thereby further reduce the volume of the final product. Preferably, the pretreated waste contains less than approximately 50 wt. % water.

The maximum achievable waste volume reductions are obtained by utilizing a reactive silica-containing material during pretreatment of hazardous, radioactive, or mixed waste streams by filtration or ion exchange. The resulting spent filter medium is then used to prepare the cement-forming composition. The reactive silica-containing material is selected based both on its ability to remove the soluble or entrained hazardous constituents from the aqueous stream and its subsequent ability to improve the stability of the final waste form. The use of reactive silica material as the filtration medium therefore allows a substantial volume reduction of the final cement waste form.

The process can be used to solidify a wide range of materials, including hazardous wastes, in cement. For example, cementation of the sludge of Example 3 is achieved by mixing SiO$_2$-containing filter aid and either portland cement or Ca(OH)$_2$. Spent filter aid, a by-product of wastewater treatment of aqueous heavy metal, hazardous, radioactive, or mixed waste streams, may be used. If desired, however, virgin filter aid or some other suitable source of reactive silica may be used.

The compositional range for cementation of hazardous, radioactive, mixed and heavy metal wastes in the (CaO+MgO)−SiO$_2$−Al$_2$O$_3$ system is shown in FIG. 4. The three apices of the phase diagram represent (CaO+MgO), Al$_2$O$_3$, and SiO$_2$. The (CaO+MgO)/Al$_2$O$_3$, SiO$_2$/Al$_2$O$_3$, and SiO$_2$/(CaO+MgO) molar ratios are indicated in wt. % along the axes. Known cementation regions for portland cement and RCRA Class F fly ash are represented as shaded regions on the diagram.

Addition of reactive silica (filter aid) and Ca(OH)$_2$ to the sludge forms calcium silicate hydrate (CSH) via the pozzolanic reaction,

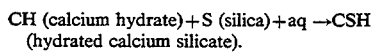
CH (calcium hydrate)+S (silica)+aq →CSH (hydrated calcium silicate).

Addition of sludge and reactive silica to portland cement causes hydration of the primary portland cement constituent, C$_3$S(CaO.3SiO$_2$) to form CSH+CH. The liberated CH continues to react with any excess reactive silica to form additional CSH via the pozzolanic reaction.

Mixtures of sludge and filter aid having SiO$_2$/Al$_2$O$_3$ molar ratios between approximately 66% (point A on the SiO$_2$-Al$_2$O$_3$ axis) and 84% (point B) formed stable cementitious wastes when mixed with Ca(OH)$_2$, Mg(OH)$_2$, or mixes of these hydroxides, as indicated in FIG. 4. Connecting point A to the (CaO+MgO) apex, and point B to the C$_3$S molar ratio (approximately 25%) on the SiO$_2$−(CaO+MgO) axis defines the compositional range for forming a stable cement. The final product stabilizes and retains the hazardous, mixed, radioactive, and heavy metal species in the sludge and spent filter aid.

The method of the present invention enhances stabilization and retention of heavy metal, hazardous, radioactive, and mixed waste species in either glass or cement by addition of reactive silica. Vitrification or cementation according to the invention can reduce the volume of hazardous/mixed wastes by up to 97%. The composition is tailored to take advantage of the common glass or cement constituents already present in the waste. This factor, together with their tolerance for many different kinds of wastes, enables glass and cement to be very accommodating to process chemistry variations.

For many types of waste, only one additive—reactive silica—is needed to make a glass-forming or cement-forming composition. For other wastes, the additional additives needed for the composition are readily determined. The maximum achievable waste volume reductions are obtained by utilizing a reactive silica-containing material during pretreatment of hazardous, radioactive, or mixed waste streams by filtration or ion exchange. The resulting spent filter medium is then used to prepare the cement-forming composition. The reactive silica-containing material is selected based both on its ability to remove the soluble or entrained hazardous constituents from the aqueous stream and its subsequent ability to improve the stability of the vitrified or cementitious final waste form. Reactive silica increases the reactivity of the glass or cement-forming composition, increases the solubility of heavy metals, hazardous metals and mixed waste constituents in the glass or cement, increases retention of waste species in the final product, and produces EPA-acceptable waste forms.

Reactive silica is readily available from spent filter aids such as SiO$_2$, perlite, diatomaceous earth, and pyrolyzed rice husks. These materials, byproducts of waste treatment processes, pose a secondary disposal problem in that they must in turn be treated and stabilized for safe storage and/or disposal. Thus, the method of the present invention can be used to dispose of spent filter aids from waste water treatment, waste sludges, combinations of spent filter aids and waste sludges, combinations of supernate and waste sludges, incinerator ash, incinerator offgas blowdown, and combinations of incinerator ash and offgas blowdown. The method is useful in solidifying other materials, including but not limited to ion exchange zeolites, inorganic filter media, asbestos, glass fiber filters, contaminated soils, cementitious wastes, and additives such as fillers and colorizing or texturizing agents. Some ion exchange zeolites, asbestos, and fiber filters are themselves reactive silica materials, thus lend themselves to vitrification or cementation on an anhydrous basis.

It will be apparent to those skilled in the art that many changes and substitutions can be made to the preferred embodiment herein described without departing from the spirit and scope of the present invention as defined by the appended claims.

What is claimed is:

1. A method for solidifying a first material to form a solid glass product, wherein said product is composed of constituents having initial molar ratios with respect to each other, one constituent of said constituents being silica, said constituents having desired molar ratios with respect to said each other, each ratio being within a preselected range, said method comprising the steps of:

determining an amount of silica and amounts of each other constituent needed to increase said initial molar ratios of said constituents of said first material to said desired molar ratios;

adding a quantity of reactive silica equal to said determined amount of silica to said first material;

adding quantities of said each other constituent equal to said determined amounts of said other constituent to said first material;

heating said first material to fusion temperature to form a molten composition; and cooling said molten composition to form said solid glass product.

2. The method as recited in claim 1, wherein said reactive silica has a surface area of at least approximately 50 m2/g.

3. The method as recited in claim 1, wherein said reactive silica is contained in a second material, said second material selected from the group consisting essentially of precipitated SiO2, perlite, diatomaceous earth, pyrolyzed rice husk, filter aid, and combinations thereof.

4. The method as recited in claim 1, wherein said first material contains water and said method further comprises the first step of removing a portion of said water so that said tint material contains less than approximately 50 wt. % water.

5. The method as recited in claim 1, wherein said preselected range of silica has a minimum and wherein said amount increases said molar ratio of silica to within said minimum.

6. The method as recited in claim 1, wherein said solidifying step is solidifying with cement.

7. The method as recited in claim 1, wherein said solidifying step is solidifying with a material chosen from the group consisting essentially of portland cement, Ca(OH)2, the alkali metal hydroxides, the alkaline earth hydroxides, and mixtures thereof.

8. A composition made from a first material, said first material having initial constituents in initial molar ratios with respect to each other, said vitrified composition having final constituents in desired molar ratios with respect to each other, said desired molar ratios being in preselected ranges, one of said initial constituents being silica, said composition made by a process comprising the steps of:

determining amounts of constituents needed to change said initial molar ratios of said initial constituents in said first material to said desired molar ratios, said amounts including an amount of silica and amounts of each other constituent of said constituents;

adding a quantity of reactive silica equal to said amount of silica;

adding quantities of said each other constituent equal to said amounts of said each other constituent, said first material, said quantity of reactive silica and said quantities of each of said each other constituent forming a mixture;

heating said mixture to fusion temperature; and cooling said mixture to form said composition.

9. The composition as recited in claim 8, wherein said reactive silica has a surface area of at least approximately 50 m2/g.

10. The composition as recited in claim 8, wherein said reactive silica is contained in a second material, said second material selected from the group consisting essentially of precipitated SiO2, perlite, diatomaceous earth, pyrolyzed rice husk, filter aid, and combinations thereof.

11. The composition as recited in claim 8, wherein said first material contains water and said method further comprises the first step of removing a portion of said water so that said first material contains less than approximately 50 wt. % water.

12. The composition as recited in claim 8, wherein said composition is soda-lime-silica (SLS) glass, and wherein said ranges of desired molar ratios of said constituents am shown in FIG. 2 and labeled vitrified ranges.

13. The composition as recited in claim 8, wherein said fusion temperature is less than 1150° C.

14. A method for preparing a solidified composition made from a first material, said first material having initial constituents in initial molar ratios with respect to each other, said solidified composition having final constituents in desired molar ratios with respect to each other, said desired molar ratios being in preselected ranges, one of said initial constituents being silica, said solidified composition made by a process comprising the steps of:

determining amounts of said initial constituents needed to change said initial molar ratios of said initial constituents in said first material to said desired molar ratios, said amounts including an amount of silica and amounts of each other constituent of said constituents;

adding a quantity of reactive silica equal to said amount of silica to said first material;

adding quantities of said each other constituent equal to said amounts of said each other constituent to said first material, said first material, said quantity of reactive silica and quantities of each of said each other constituent forming a mixture; and solidifying said mixture.

15. The method as recited in claim 14, wherein said solidifying step further comprises the steps of:

heating said mixture to fusion temperature; and cooling said mixture to form said composition.

16. The method as recited in claim 14, wherein said solidifying step further comprises the steps of mixing said first material with cement to form a mixture; and allowing said mixture to cure.

17. The method as recited in claim 14, wherein said reactive silica has a surface area of at least approximately 50 m2/g.

18. The method as recited in claim 14, wherein said reactive silica is contained in a second material, said second material selected from the group consisting essentially of precipitated SiO2, perlite, diatomaceous earth, pyrolyzed rice husk, filter aid, and combinations thereof.

19. The method as recited in claim 14, wherein said first material contains water and said method further comprises the step of removing a portion of said water before determining said amount of silica.

* * * * *